US010272461B2

(12) United States Patent
Coskun et al.

(10) Patent No.: US 10,272,461 B2
(45) Date of Patent: Apr. 30, 2019

(54) METHOD FOR MASKING COOLING PASSAGES

(71) Applicant: GENERAL ELECTRIC COMPANY, Schenectady, NY (US)

(72) Inventors: Kemal Mehmet Coskun, Gebze/Kocaeli (TR); Cem Murat Eminoglu, Simpsonville, SC (US); Yusuf Eren Ozturk, Gebze/Kocaeli (TR); Tyler Watson Kasperski, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/661,759

(22) Filed: Jul. 27, 2017

(65) Prior Publication Data
US 2018/0281006 A1    Oct. 4, 2018

(30) Foreign Application Priority Data

Apr. 4, 2017    (TR) .................................. 2017/05039

(51) Int. Cl.
*F01D 5/18* (2006.01)
*B05B 12/26* (2018.01)
(Continued)

(52) U.S. Cl.
CPC ................ *B05B 12/26* (2018.02); *C23C 4/02* (2013.01); *F01D 5/186* (2013.01); *F01D 5/187* (2013.01);
(Continued)

(58) Field of Classification Search
CPC ... F01D 5/187; B25J 11/0075; F05D 2230/60; F05D 2230/90; F05D 2260/202
See application file for complete search history.

(56) References Cited

U.S. PATENT DOCUMENTS 5,985,122 A     11/1999   Conner
6,042,879 A *   3/2000    Draghi ..................... C23C 4/02
                                                    29/889.1
(Continued)

FOREIGN PATENT DOCUMENTS

JP      04-236757 A     5/1992
JP      H11355146 A     12/1999

*Primary Examiner* — Jethro M. Pence
(74) *Attorney, Agent, or Firm* — McNees Wallace & Nurick LLC

(57) ABSTRACT

A method for masking cooling passages of a turbine component having an external surface, an internal cavity for receiving cooling air, and cooling passages extending therebetween. The location and angle of cooling passages are determined using a robotic arm and a location system. A masking device is placed in the cooling passages located during the locating step. The masking device includes a head portion having a gripping feature for gripping by a robotic arm, and a locating feature for orientation of the masking device by the robotic arm. A retaining portion extending from the head portion is arranged and disposed to retain the masking device in a cooling passage. The retaining portion is narrower proximate a distal end than proximate the head portion. The component and head portion of the masking devices are coated. The masking devices may be removed using the robotic arm and locating system.

17 Claims, 7 Drawing Sheets

(51) Int. Cl.
 *C23C 4/02* (2006.01)
 *B25J 11/00* (2006.01)

(52) U.S. Cl.
 CPC ...... *B25J 11/0075* (2013.01); *F05D 2230/311* (2013.01); *F05D 2230/60* (2013.01); *F05D 2230/90* (2013.01); *F05D 2260/202* (2013.01)

(56) References Cited

U.S. PATENT DOCUMENTS

| | | |
|---|---|---|
| 6,258,226 B1 | 7/2001 | Conner |
| 6,265,022 B1 | 7/2001 | Fernihough et al. |
| 7,147,899 B2 | 12/2006 | Fernihough et al. |
| 7,192,622 B2 | 3/2007 | Fernihough et al. |
| 8,722,144 B2 | 5/2014 | Ohara |
| 9,051,879 B2 | 6/2015 | Ohara |
| 9,061,347 B2 | 6/2015 | Crowther et al. |
| 2005/0084657 A1 | 4/2005 | Ohara |
| 2013/0302522 A1 | 11/2013 | Eminoglu et al. |
| 2014/0161585 A1 | 6/2014 | Arness et al. |
| 2015/0159254 A1* | 6/2015 | Reid .................. C23C 4/18 428/137 |
| 2015/0190836 A1* | 7/2015 | Deck .................. B05B 15/0462 156/293 |

\* cited by examiner

METHOD FOR MASKING COOLING PASSAGES

FIELD OF THE INVENTION

The present invention is directed to a method for masking cooling holes in a turbine component and a masking device for masking the cooling holes. More particularly, the invention is directed to a method for locating the cooling holes in a turbine component, robotically inserting masking devices in the cooling holes, and subsequent to thermal spraying with the cooling holes masked, robotically removing the masking devices from the cooling passages.

BACKGROUND OF THE INVENTION

Gas turbines are continuously being modified to increase efficiency and decrease cost. One method for increasing the efficiency of a gas turbine includes increasing the operating temperature. Increases in operating temperature result in more extreme operating conditions which have led to the development of advanced super alloy materials and complex coating systems designed to increase the heat tolerance of the turbine components and protect the turbine components from reactive gasses in the hot gas path of the gas turbine.

The temperature tolerance of a turbine component may also be increased through the use of cooling channels. Cooling channels are typically incorporated into the metal and ceramic substrates of turbine components used in high temperature regions of gas turbines. Cooling holes are masked before the component is coated with a thermal barrier. The masks prevent materials from plugging cooling holes during the coating process. Existing techniques for masking cooling holes include manually inserting plugs into the cooling holes before the coating process and manually removing plugs after the coating process. Another known technique injects a gel that solidifies into each cooling hole to mask the cooling holes during the coating process. After the coating process, the gel is removed. Another known technique plugs the cooling holes by welding a plug in each cooling hole. After the coating process, removal of the plugs causes damage to some of the cooling holes or surrounding area that requires additional processing to return the cooling holes or the surrounding area to operational condition. A mask process that can with high reliability and repeatability identify, mask and unmask cooling holes would be desirable in the art.

BRIEF DESCRIPTION OF THE INVENTION

In an exemplary embodiment of the invention, a method for masking cooling passages in a component includes determining a location of cooling passages to be masked using a robotic arm and a location system. A robotic arm is used to place a masking device in at least one cooling passage located in the location determining step. The masking device includes a head portion having a gripping feature for gripping by the robotic arm and a retaining portion extending from a lower surface of the head portion. The head portion having a locating feature for the robotic arm to determine an orientation of the masking device. The retaining portion being narrower proximate a distal end than proximate the head portion, the retaining portion being arranged and disposed to retain the masking device in the cooling passages. The component and the head portions of the masking devices are coated. The masking devices may be removed using the robotic arm, and if needed, the locating system.

In an another exemplary embodiment of the invention, a masking device for masking cooling passages in a component includes a head portion having a gripping feature for gripping by a robotic arm. The head portion having a locating feature for the robotic arm to determine an orientation of the masking device. A retaining portion extends from a lower surface of the head portion. The retaining portion being arranged and disposed to retain the masking device in the cooling passage.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
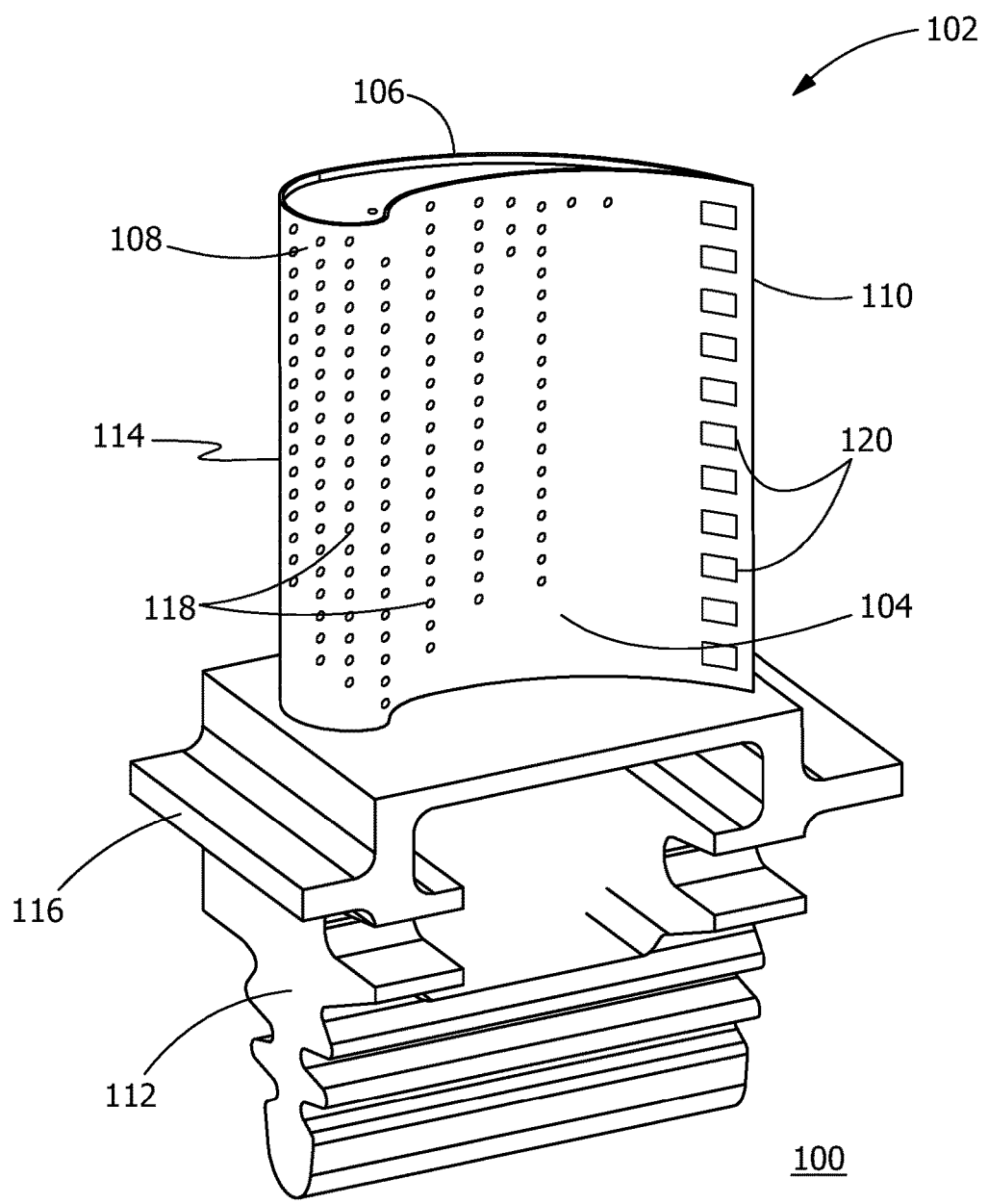
FIG. 1 is a perspective view of a blade.

FIG. 1 is a perspective view of a turbine component 100, an exemplary turbine blade 102. Turbine blade 102 includes a pressure side 104 and a suction side 106 connected together at a leading edge 108 and a trailing edge 110. Pressure side 104 is generally concave and suction side 106 is generally convex. Turbine blade 102 includes a dovetail 112, airfoil 114 and platform 116 extending therebetween. Hollow components such as airfoil 114 and platform 116 have cooling holes 118 which extend from a cavity in the hollow interior of the component 100 to the exterior of the component. The cooling holes provide a cooling air flow film from the cavity within the component 100, through cooling holes 118, along surfaces of the component 100 surfaces to cool the of the surfaces of component 100.

Airfoil 114 has an internal cavity between pressure side 104 and suction side 106 for receiving cooling air as is known in the art. The cooling air passes from the cavity, through cooling holes 118 to provide a cool air layer between the hot gasses moving through the turbine and the external surfaces of pressure side 104, suction side 106, and leading edge 108. Dovetail 112 may be integrally formed on the underside of the platform 116 for mounting turbine blade 102 in a complementary retentive structure of a disk within a turbine. In some embodiments, dovetail 112 of turbine blade 102 couples to a rotor shaft (not shown) by way of dovetail 112 and extends radially outward. In some alternate embodiments, turbine blade 102 may be coupled to a rotor shaft by other devices configured to couple a turbine blade to a rotor shaft, such as a blisk.

Airfoil 114 has a cavity between pressure side 104 and suction side 106 for receiving cooling air. The cooling air passes from the cavity through cooling holes 118 distributed over the surfaces of pressure side 104, suction side 106, and leading edge 108 of turbine component 100 to provide a cooling fluid layer between the hot gas products passing through the turbine and the surfaces of pressure side 104, suction side 106, and leading edge 108 of turbine component 100. The technique disclosed herein can be used for new blades or for refurbishing a blade that has been used in a turbine. If cooling holes 118 are worn or otherwise compromised due to use, the cooling holes should be repaired to their original shape prior to masking the cooling holes in preparation of coating a turbine component 100 in a thermal spraying process.

Figure 2:
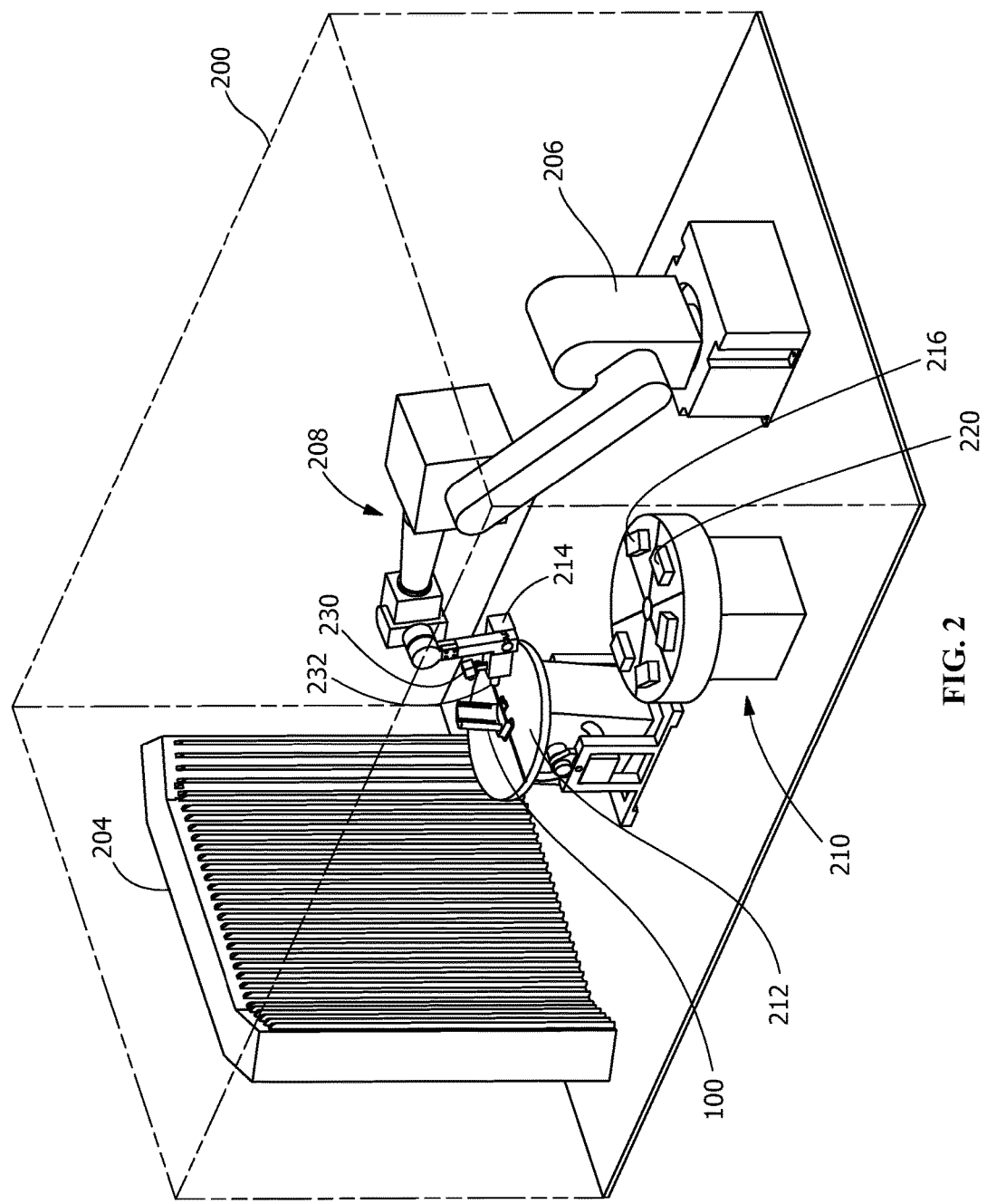
FIG. 2 is a robotic system including a robotic arm equipped to locate cooling holes, place a masking device in the cooling holes, and remove the masking devices from the cooling holes after the blade is coated in a thermal spray enclosure.

After appropriate cleaning of turbine component 100, a ceramic thermal barrier coating 202 is applied over the surfaces of pressure side 104, suction side 106, and leading edge 108 of the turbine component 100 using a thermal spraying process, including but not limited to, plasma spraying and high velocity oxygen fuel (HVOF) spraying. As is known in the art for isolation and safety, thermal spraying process is carried out in a thermal spray enclosure 200, as illustrated in FIG. 2. The enclosure 200 is shown as a dashed line so the equipment inside enclosure 200 is visible. The thermal spray enclosure 200 has a controlled or controllable atmosphere, or isolation from an exterior environment. Equipment 204 within the thermal spray enclosure 200 processes the gases produced and safely exhausts the gasses as is known in the art. Process steps other than the coating step, both before and after the coating step, can be carried out within or outside of the thermal spray enclosure. One such step is masking the cooling holes 118 before the coating is applied to prevent the cooling holes 118 being blocked, completely or partially, by the coating 202.

A programmable robotic system 206 including a robotic arm 208 with multiple replaceable heads 210 and a component support 212 on which the turbine component 100 is secured are positioned within the enclosure 200. With the turbine component 100 secured on component support 212, a vision system head 214 is attached to robotic arm 208. The robotic arm systematically moves the vision system head 214, or vision system, over the area of surfaces of the turbine component 100. The vision system scans surfaces of the turbine component 100 for cooling holes 118 and determines and stores the location and angle of orientation of each cooling hole 118 for insertion of a masking device 300 illustrated in FIG. 3. A vision system having two dimensional imaging, laser striping or thermal imaging can locate cooling holes 118 and determine the angle of orientation of the cooling holes relative to the turbine component and the position of the robotic arm 208. The necessary equipment such as a digital camera 230, having thermal imaging if needed, and a laser 232, as well as control and operating software for the equipment are integrated with the programmable robotic system 206. The robotic system 206 may also store the location and angle of orientation of each cooling hole 118 more permanently for later use to remove the masking devices 300 after the coating process.

Figure 10:
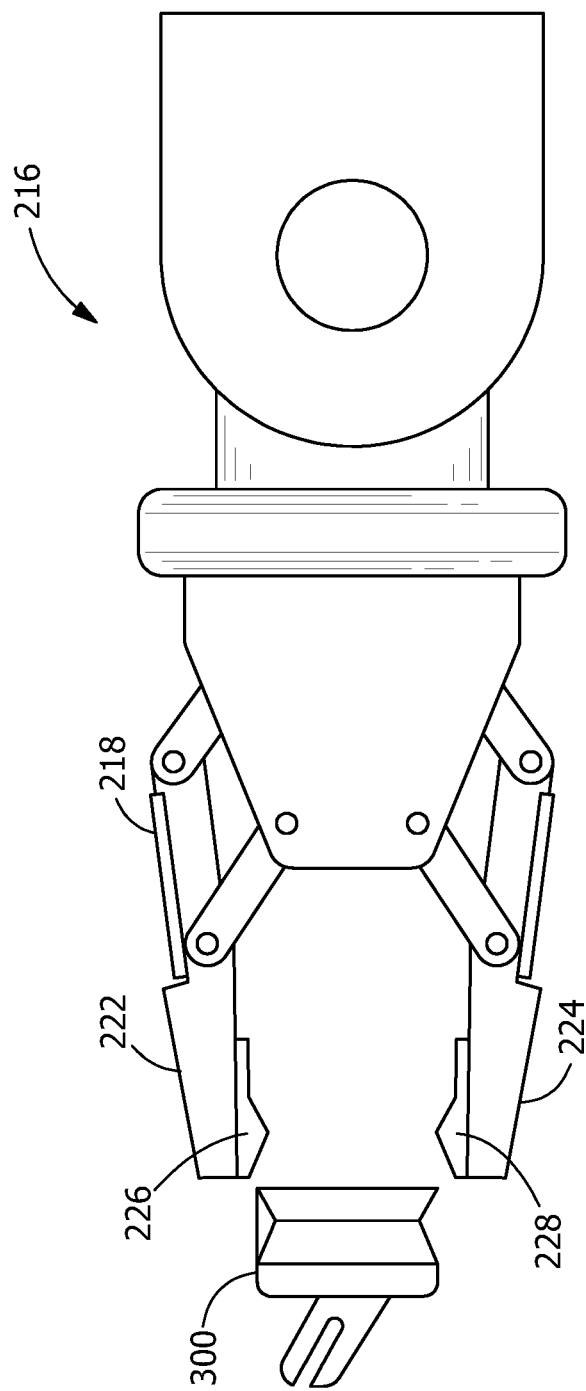
FIG. 10 is a top view of an embodiment of a placement device head.

Upon completion of scanning the surfaces of turbine component 100 to locate cooling holes and determine an angle of orientation of an axis of the cooling holes, the vision system head 214 on robotic arm 208 is removed and replaced with a placement device head 216. An embodiment of a placement device head 216 is illustrated in FIG. 10. Placement device head 216 has a gripper 218, such as but not limited to a multi-finger gripper, to place a masking device 300 in a cooling hole 118 identified by the vision system. Gripper 218 has two gripping fingers 222 and 224 having respective securing protrusions 226 and 228 to secure a masking device in the grasp of gripping fingers 224 and 226. Gripping finger 222 also may sense the presence of locating feature 308, if present. Masking devices 300 are provided to the robotic system 206 using any known feed system or method, including but not limited to, a magazine feed system, a vibratory feeder, band fed strips and gravity fed tube columns. In the each feed system, the masking devices may be positioned in a consistent, predetermined, orientation. When the gripper 218 grasps a masking device 300 for placing in a cooling hole 118, a locating feature 308, if present, is sensed. The locating feature 308 indicates a direction the distal end 320 of the retaining portion 310 of masking device 300 extends away from the masking device. The gripper 218 holds the masking device 300 in a known orientation so the robotic arm, knowing the acute angle formed between lower surface 312 of masking device 300 and an axis of the retaining portion 310, can position the retaining portion 310 of the masking device 300 to align with the cooling hole 118 prior to inserting each masking device 300 into a corresponding respective cooling hole 118. More specifically, an axis of retaining portion 310 may align with an axis of the cooling hole into which the masking device is to be inserted. The vision system head 214, placement device head 216, and removal device head 220, when attached to robotic system 206 are coupled to and interface with the control system controlling the robotic system 206 and any other computing system needed to perform the functions associated with scanning a turbine component to locate cooling holes 118, determine the location of cooling holes, and determine the angle of cooling holes such as the angle of an axis of the cooling holes, changing of replaceable heads and mask removal.

The robotic system 206 systematically sequences through all of the cooling holes 118 identified by the vision system head 214 inserting a masking device 300 into each cooling hole 118. A force sensor on the robotic arm can detect the magnitude of force required to insert each masking device. If the insertion force is within a predetermined acceptable range of force, the robotic system 206 is programmed to pick up the next masking device from the feed system and sequence to the next cooling hole 118 to insert the masking device 300. If the insertion force is not within a predetermined acceptable range of force, the robotic system 206 is programmed to discard the low-insertion-force masking device, pick up the next masking device from the feed system, and attempt to insert the masking device in the same cooling hole, until either an insertion force is achieved within the acceptable range of force or the number of attempts reaches a predetermined limit, whichever occurs first. The robotic system 206 is programmed to identify and flag any cooling hole having an out-of-range force for later inspection. After all of the cooling holes 118 have been masked by a masking device 300, the robotic head can be changed one or more times to as required by the thermal spraying process to carry out the thermal spraying process to coat the surfaces of the turbine component 100 without having the ceramic thermal barrier coating material 202 block, or partially block, cooling holes 118.

When the coating process is complete, if the turbine component 100 has not been moved, the replaceable head 210 is replaced by the placement device head 216 to remove the masking devices 300 from respective cooling holes 118. Robotic systems capable of being programmed to change heads are known in the art. If the position and angle of the cooling holes 118 were not retained by the robotic system 206, the vision system head 214 replaces the replaceable head 210 and again scans to locate the masking devices 300 on the surfaces of the turbine component. The replaceable head 210 is replaced with the pick and place head. The robotic system 206 systematically sequences through all of the cooling holes 118 identified by the vision system head 214, removing a masking device 300 from each cooling hole 118 and disposing of the removed masking device until all masking devices 300 have been removed from the turbine component 100.

If the turbine component 100 has been removed from the component support 212 after the vision system scans surfaces of the turbine component 100 for cooling holes 118 and determines and stores the location and angle of orientation of each cooling hole 118 and before the masking devices are removed, it may be necessary for the robotic system 206 to rescan the turbine component with vision system head 214 to identify the location of the masking devices 300 as the turbine component may have been remounted on component support 212 in a different position than during the initial scan. Such a rescanning of the turbine component 100 identifies the current position of the masking devices for robotic removal of the masking devices 300 by robotic system 206.

The pick and placement device head 216 having gripper 218 is mounted on the robotic arm 208 for removal of the masking devices. The robotic arm systematically moves the gripper 218 over the areas of the turbine component where masking devices 300 were inserted in cooling holes 118 based on the stored information of where masking devices were inserted. For the turbine blade 102 the areas are the pressure side 104, the suction side 106 and the leading edge 108. For each stored location, the location and angle of orientation of each cooling hole 118 are used to locate, grasp and remove a masking device 300 previously inserted in the cooling hole. The robotic arm removes the masking device from each cooling hole 118 by applying a force directed away from the surface of the turbine component 100 in the direction of the axis of the cooling hole.

Figure 3:
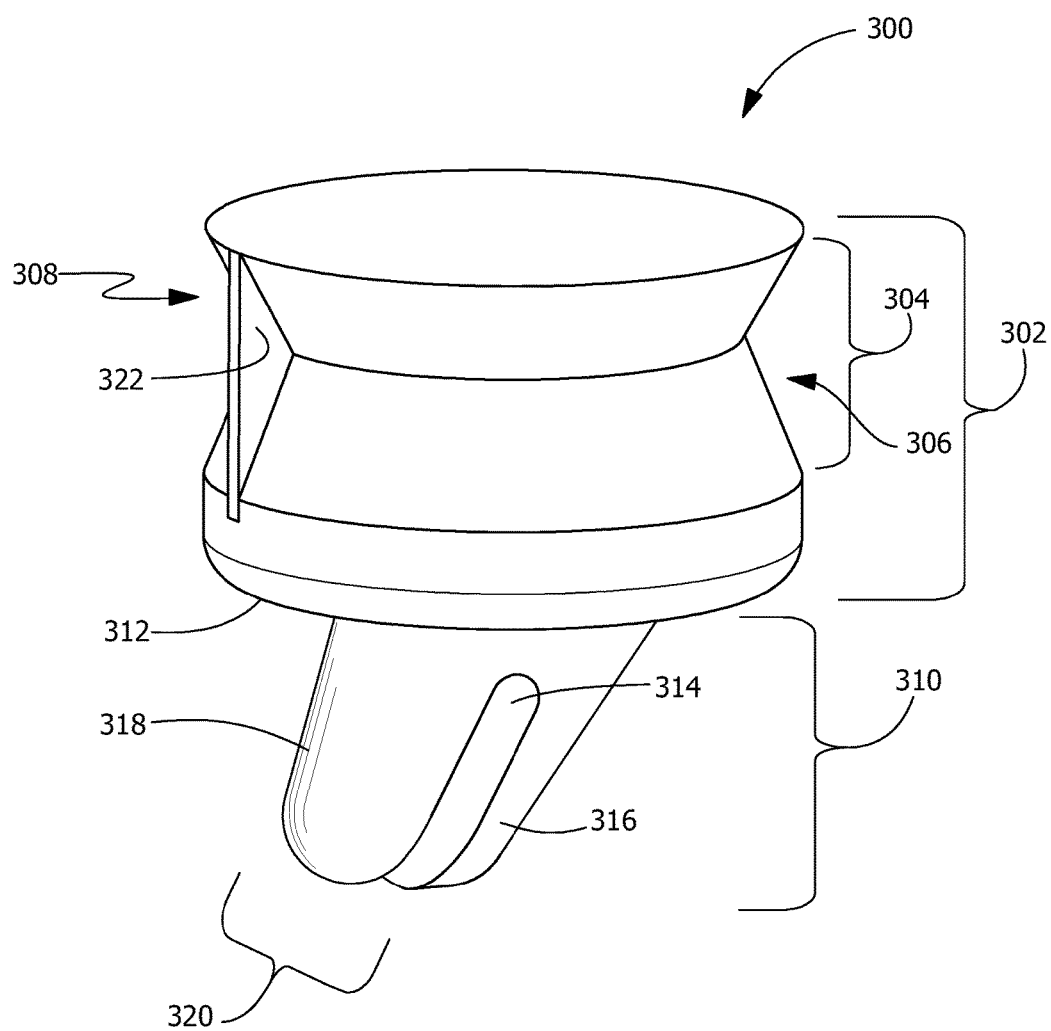
FIG. 3 is an enlarged perspective view of an embodiment of a masking device.

FIG. 3 is an enlarged perspective view of an embodiment of a masking device 300 suitable for positioning in cooling holes in turbine components 100 and withstanding the temperatures and velocities of gas flow during the thermal spraying process to coat the surfaces of the turbine component 100, yet be easily removed from respective cooling holes 118 subsequent to the coating process. Masking device 300 includes a head portion 302 that shadows over edges of the cooling holes in which they are inserted to prevent coating material from entering and plugging cooling holes 118, partially or completely, during a thermal spraying process. The overshadowed area 404 is not coated during the coating process. The masking device 300 also has a gripping feature 304, for being grasped by a robotic arm 208 having a gripper 218. In the embodiment illustrated in FIG. 3, the gripping feature is a groove 306 in a sidewall of head portion 302. Some embodiments of placement device head have gripping fingers can place rollers, fingers or portions thereof, such as securing protrusions 226 and 228, in the narrower space of groove 306 and grasp the masking device 300 for insertion into a cooling hole 118 in turbine component 100. The robotic system 206 can quickly, accurately, and with high reliability locate the cooling holes, determine the angle of the cooling holes, and insert masking devices 300.

Figure 4:
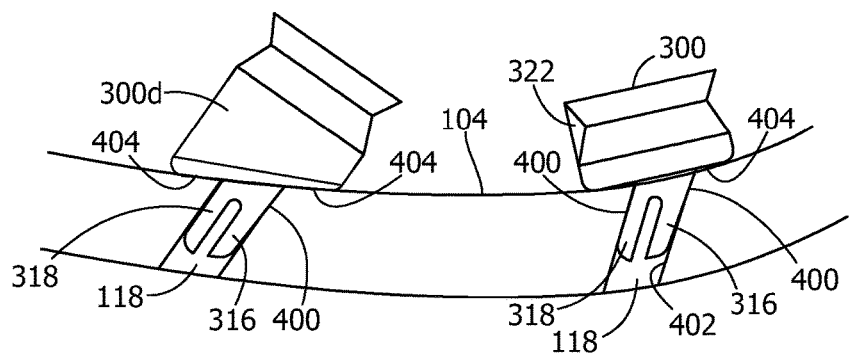
FIG. 4 is a sectional view of the airfoil pressure side showing two masking devices with retention portions inserted in cooling holes.
Figure 5:
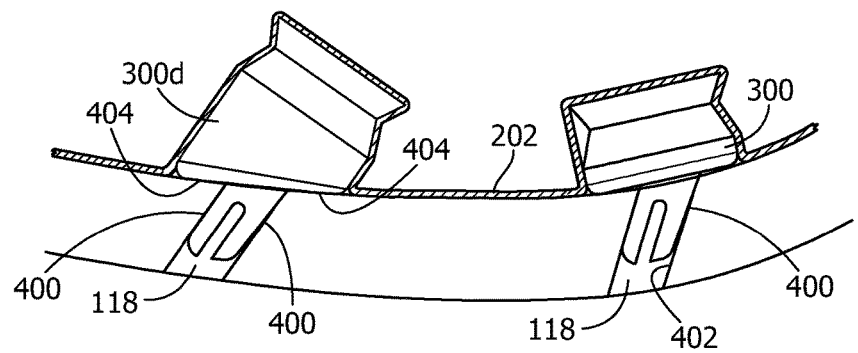
FIG. 5 is the sectional view of FIG. 4 subsequent to a thermal spraying process.

The head portion 302 also has a locating feature 308 for a robotic arm 208 to determine an orientation of the masking device 300. The masking device 300 has a retaining portion 310 extending from a lower surface 312 of head portion 302. The lower surface 312 extends outwardly beyond an edge or sidewall 402 of a cooling hole 118 as illustrated in FIG. 4 to prevent material from the thermal spraying process from entering the cooling holes 118. The retaining portion 310 is narrower proximate the distal end 320 than proximate the head portion 302. The retaining portion is arranged and disposed to retain the masking device 300 in a cooling hole 118 in which it is inserted throughout the thermal spraying process. The retaining portion 310 tapers from proximate the head portion 302 to proximate the distal end 320. In some embodiments, a slot 314 divides the retaining portion 310 into first and second legs, 316 and 318, respectively, with a spacing of slot 324 therebetween. First and second legs 316 and 318 provide a wedging action interference fit 400 between legs 316 and 318 and a sidewall 402 of cooling hole 118 as illustrated in FIGS. 4 and 5 upon the masking device 300 being inserted into a cooling hole 118 to secure masking device 300 therein. Legs 316 and 318 of masking device 300 extend away from lower surface 312 of head portion 302 forming an angle with a center line through head portion 302. The lower surface 312 forms an angle with the center line through the head portion 302. The angle may range from zero to ninety degrees.

The head portion 302 also has a locating feature 308 for a robotic arm 208 to determine an orientation of the masking device 300. As illustrated in FIG. 3, in some embodiments the locating feature 308 is an additive structure, such as but not limited to tab 322 extending across the groove 306. The locating feature 308, is sensed by a robotic arm 208 having gripping fingers that can place rollers or fingers in the groove and detect the presence and location of tab 322 as indicating the orientation of the retaining portion 310 of masking device 300. The locating feature 308 indicates the direction the retaining portion 310 of masking device 300 is angled. The gripper 218 holds the masking device 300 in a known orientation so the robotic arm can position the retaining portion 310 of the masking device 300 to align with the cooling hole 118 the masking device 300 is being inserted into a respective cooling hole 118 at the angle determined by the vision system.

Figure 6:
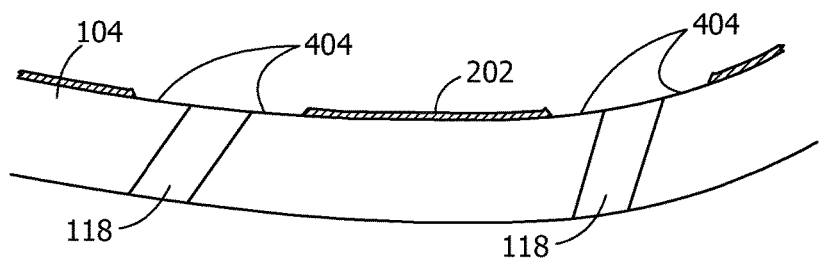
FIG. 6 is a sectional view of FIG. 5 with the masking devices removed.

When masking devices are removed using the robotic system 206, masking devices 300 may be removed with a removal device head 220 on the robotic arm 208 as described above. The removal device head 220 may be the same as or different than the placement device head 216. Upon removal of masking devices 300, the overshadowed area 404 of the pressure side 104 of airfoil 114 that is not coated during the thermal coating process is evident as illustrated in FIG. 6.

Masking device 300 can be made of the same material as the turbine component 100 having cooling holes 118 is made of, as well as various other materials including other metals and high strength ceramic, such as an aluminum ceramic. The first and second legs, 316 and 317, of retaining portion 310 are flexed toward each other during insertion of the masking device 300 into a cooling hole 118, providing a spring enhanced interference fit 400 with the cooling hole 118 in which the masking device is positioned, and securing masking device 300 in cooling hole 118 to withstand the harsh conditions of thermal spraying. The masking device may have a coefficient of thermal expansion equal to or greater than the coefficient of thermal expansion of the component material in which the cooling holes are located.

The material composition of the masking device determines the available methods of manufacturing the masking device 300. A metal or metal alloy masking device 300 can be made by processes including, but not limited to, an injection molding process, an additive manufacturing method, and machining metal.

Figure 7:
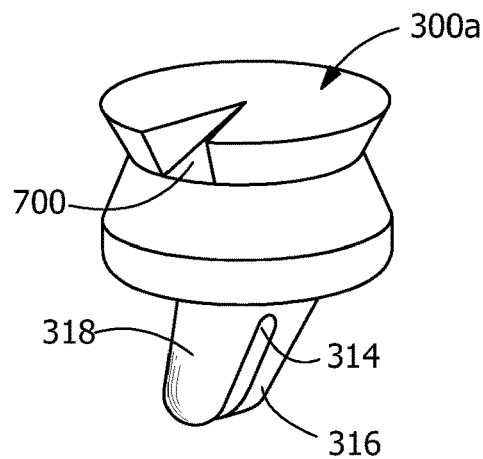
FIG. 7 is a perspective view of an alternate embodiment masking device having a subtractive location feature.

As illustrated in FIG. 7, in some embodiments the masking device 300a may have a head portion 302a with a locating feature that is a subtractive structure such as notch 308a. The locating feature is also for a robotic arm 208 to determine an orientation of the masking device 300a. A subtractive locating feature 308a is not limited to being a notch.

Figure 8:
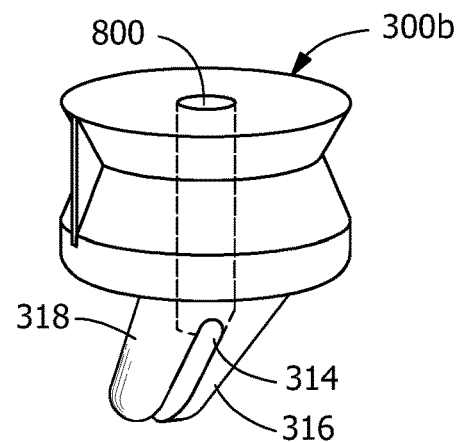
FIG. 8 is a perspective view of another alternate embodiment masking device having a bore through the head portion in fluid communication with a slot.

As illustrated in FIG. 8, in some embodiments the masking device 300b may have a bore 800 through the head portion in fluid communication with slot 314. Bore 800 permits adhesive to flow through the bore 800 into the slot 314 and cooling holes 118 to assist retaining masking devices 300b in the cooling holes 118.

Figure 9:
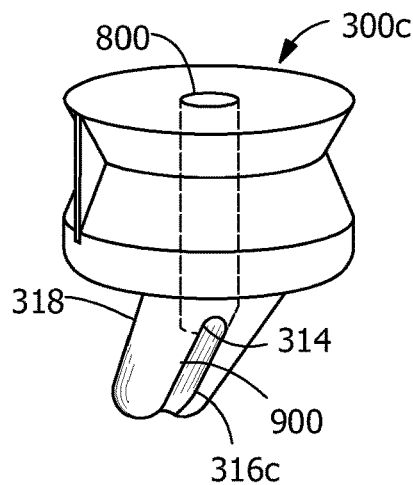
FIG. 9 is a perspective view of yet another alternate embodiment masking device that has a hollowed out leg.

As illustrated in FIG. 9, in some embodiments the masking device 300c may have a hollowed out leg 316c that facilitates the passage of adhesive from bore 800 into the cooling hole 118 to aid retaining the masking device 300c in the cooling hole 118.

Figure 11:
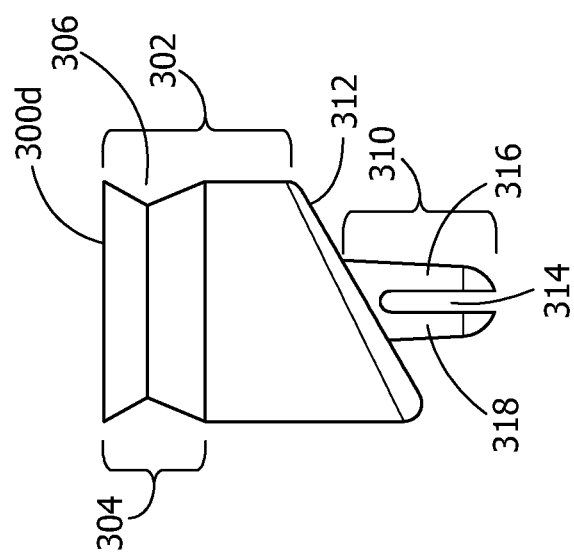
FIG. 11 is an enlarged side view of yet another alternate embodiment masking device.

As illustrated in FIG. 11, in some embodiments the masking device 300d may have legs 316 and 318 that extend away from lower surface 312 of head portion 302 in alignment with a center line through head portion 302. The lower surface 312 forms an angle with the center line through the head portion 302. The angle may range from zero to ninety degrees. The presence of a locating feature is not necessary as the legs of masking device 300d align with a center line of the head portion and can be inserted by a force being directed along the center line in the direction of insertion.

As illustrated in FIGS. 4 and 5, masking device 300d can be inserted into a cooling hole 118 to prevent products of a thermal spraying process from plugging, partially or wholly, cooling holes 118. Masking devices 300d may have a gripping feature 304 for insertion of masking devices 300d before a thermal spraying process and removal from turbine component 100 after a thermal spraying process.

Figure 12:
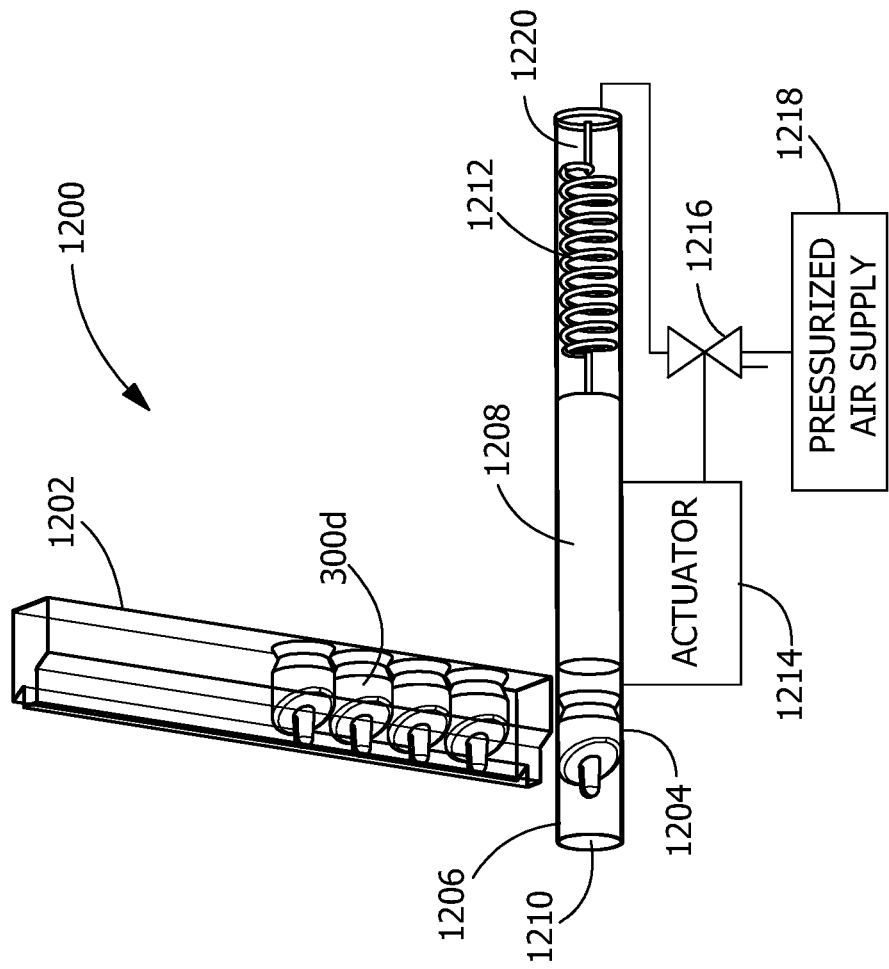
FIG. 12 is a perspective view of an alternate embodiment of a placement device head.

Masking devices 300d can be inserted in cooling holes 118 using the robotic system 206 and a placement device 216 such as a gripper 218. Since the legs 316 and 318 align with a center line of the head portion 302, alternative mechanical equipment can be used to insert masking devices 300d into cooling holes 118 in turbine component 100. As illustrated in FIG. 12, in some embodiments masking devices 300d can be installed using an air driven insertion tool 1200. A magazine 1202 supplies masking devices 300d one at a time to a chamber 1204 in a forward portion of the tube 1206. Magazine 1202 maintains orientation of the masking devices 300d in a predetermined, known orientation. A ram 1208 in a central portion of tube 1206 of the tool aligns with an is moveable to push a masking device 300d in chamber 1204 out of tube 1206 through opening 1210. The action of spring 1212, or alternately air pressure, retracts ram 1208 to clear the chamber 1204 permitting another masking device 300d to enter chamber 1204.

Tool 1200 is used by attaching a magazine 1202 containing masking devices 300d into chamber 1204. Opening 1210 is placed adjacent to a cooling hole 118 into which a masking device is to be placed. The centerline of tube 1206 is aligned with the axis of the cooling hole 118. The state of actuator 1214 is changed causing valve 1216, which may be a double acting valve that can use a pressurized air source to provide pressurized air or a vacuum, to provide pressurized air from pressurized air supply 1218 to air chamber 1220 in a rearward portion of tube 1206. The pressurized air overcomes the spring force and pushes the ram 1208 to engage the masking device 300d in chamber 1204 and push the masking device out opening 1210 and the legs 316 and 318 thereof into the cooling hole 118 aligned with the tool. The distal ends of legs 316 and 318 assist in guiding legs 316 and 318 into cooling hole 118. The air supply 1218 to air chamber 1220 is terminated and ram 1208 is withdrawn to the central portion of tube 1206 as described above, and another masking device 300d is loaded from magazine 1202 in preparation to repeat the cycle.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A masking device for masking cooling passages in a component, comprising:
    a head portion having a gripping feature for gripping by a robotic arm, the head portion having a locating feature for the robotic arm to determine an orientation of the masking device; and
    a retaining portion extending from a lower surface of the head portion, the retaining portion being narrower proximate a distal end than proximate the head portion, the retaining portion being arranged and disposed to retain the masking device in a cooling passage,
    wherein the orientation of the masking device is a rotational orientation about a central axis of the head portion, and
    wherein the retaining portion extends away from the lower surface of the head portion at an angle and the locating feature indicates a direction in which a central axis of the retaining portion is angled relative to the central axis of the head portion.

2. The masking device as recited in claim 1, wherein the retaining portion being narrower proximate the distal end than proximate the head portion comprises the retaining portion tapering from the lower surface of the head portion to the distal end.

3. The masking device as recited in claim 1, wherein the gripping feature is a groove in a sidewall of the head portion.

4. The masking device as recited in claim 1, wherein the retaining portion includes a slot extending from the distal end toward the head portion providing two spring members.

5. The masking device as recited in claim 1, wherein the head portion of the masking device includes a bore through the head portion in fluid communication with the slot in the retaining portion.

6. The masking device as recited in claim 1, wherein the locating feature is an orientation tab.

7. The masking device as recited in claim 1, wherein the masking device is made of the same material as the component in which the cooling passages are formed.

8. The masking device as recited in claim 1, wherein the masking device is retained in a cooling passage by an interference fit.

9. The masking device as recited in claim 1, wherein the locating feature includes an orientation tab for rotationally orienting the retaining portion of the masking device about the central axis of the head portion for insertion into a cooling passage.

10. The masking device as recited in claim 1, wherein the retaining portion includes a first leg and a second leg.

11. The masking device as recited in claim 10, wherein the first leg and the second leg extend away from the lower surface of the head portion forming the angle between a central axis of the retaining portion and the central axis of the head portion.

12. The masking device as recited in claim 1, wherein the masking device is made of a ceramic material.

13. The masking device as recited in claim 12, wherein the ceramic material is an aluminum ceramic.

14. The masking device as recited in claim 1, wherein the masking device is made of a metal other than the material of the component in which the cooling passages are formed.

15. The masking device as recited in claim 1, wherein the locating feature is a subtractive structure.

16. The masking device as recited in claim 15, wherein the subtractive feature is a notch.

17. A method for masking cooling passages in a component, comprising:
   determining a location of cooling passages using a robotic arm and a location system to locate the cooling passages to be masked;
   using the robotic arm, placing a masking device in at least one cooling passage located in the locating step, the masking device comprising:
      a head portion having a gripping feature for gripping by the robotic arm, the head portion having a locating feature for the robotic arm to determine an orientation of the masking device; and
      a retaining portion extending from a lower surface of the head portion, the retaining portion being narrower proximate a distal end than proximate the head portion, the retaining portion being arranged and disposed to retain the masking device in the cooling passage;
   coating the component and the head portions of the masking devices; and
   removing the masking devices using the robotic arm and locating system,
   wherein the orientation of the masking device is a rotational orientation about a central axis of the head portion, and
   wherein the retaining portion extends away from the lower surface of the head portion at an angle and the locating feature indicates a direction in which a central axis of the retaining portion is angled relative to the central axis of the head portion.

* * * * *